United States Patent
Vaitus et al.

(10) Patent No.: US 6,834,906 B2
(45) Date of Patent: Dec. 28, 2004

(54) VEHICLE LIFTGATE WITH COMPONENT MODULE APPLIQUE

(75) Inventors: Leonida S. Vaitus, Windsor (CA); Philippe Gougeon, Bloomfield Hills, MI (US); William Ethan A. McClure, Clawson, MI (US); William C. Romesburg, Troy, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/331,640

(22) Filed: Dec. 30, 2002

(65) Prior Publication Data

US 2004/0124659 A1 Jul. 1, 2004

(51) Int. Cl.⁷ ............................... B60J 5/10; B60J 1/20
(52) U.S. Cl. ..................... 296/106; 296/146.8; 296/52
(58) Field of Search .................... 296/96.15–96.17, 296/146.1, 146.2, 146.8, 106, 50, 51, 56; 49/502; 180/169

(56) References Cited

U.S. PATENT DOCUMENTS

| | | | | |
|---|---|---|---|---|
| 5,793,308 A | * | 8/1998 | Rosinski et al. | ............. 340/903 |
| 6,019,418 A | * | 2/2000 | Emerling et al. | ......... 296/146.8 |
| 6,030,105 A | * | 2/2000 | Thau et al. | ................. 362/488 |
| 6,123,384 A | * | 9/2000 | Eustache et al. | ......... 296/146.2 |
| 6,131,989 A | | 10/2000 | Montone et al. | |
| 6,174,016 B1 | * | 1/2001 | Ponziani | ...................... 296/56 |
| 6,216,309 B1 | | 4/2001 | Goto et al. | |
| 6,222,447 B1 | * | 4/2001 | Schofield et al. | ........... 340/461 |
| 6,234,564 B1 | | 5/2001 | Kim | |
| 6,237,185 B1 | | 5/2001 | Goto et al. | |
| 6,416,106 B2 | * | 7/2002 | Ponziani | ...................... 296/56 |
| 6,435,596 B1 | | 8/2002 | Pyo | |
| 6,509,832 B1 | * | 1/2003 | Bauer et al. | ............. 340/425.5 |
| 6,523,882 B2 | * | 2/2003 | Ishikawa et al. | ......... 296/146.8 |
| 2001/0001336 A1 | | 5/2001 | Kobayashi et al. | |
| 2001/0011831 A1 | | 8/2001 | Ohashi et al. | |

FOREIGN PATENT DOCUMENTS

| | | |
|---|---|---|
| EP | 0 916 559 | 5/1999 |
| EP | 1 074 442 | 2/2001 |
| EP | 1 083 101 | 3/2001 |
| GB | 2 327 598 | 2/1999 |
| GB | 2 347 340 | 9/2000 |
| JP | 11 301420 | 11/1999 |
| JP | 2000062575 | 2/2000 |
| JP | 20000326830 | 11/2000 |

* cited by examiner

Primary Examiner—D. Glenn Dayoan
Assistant Examiner—G Blankenship
(74) Attorney, Agent, or Firm—J. Gordon Lewis

(57) ABSTRACT

A module in the form of an applique is mountable on an exterior surface of a vehicle liftgate and provides a mounting platform for a plurality of components mountable on the liftgate in a single assembly operation. The components include at least two of light sources in the form of LEDs or incandescent bulbs, an actuatable switch, a camera and a wash fluid dispensing nozzle. The components are mounted on a substrate in the form of a printed circuit board or a lead frame attached to a substrate for mounting in a carrier. The carrier is affixed to the module and is alignable with apertures in the applique for transmission of light from the light sources exteriorly of the applique as well as to enable the camera to view a field of view through the lens. The electric switch is actuatable by a resilient membrane mounted on the carrier and actuatable exteriorly of the applique.

25 Claims, 7 Drawing Sheets

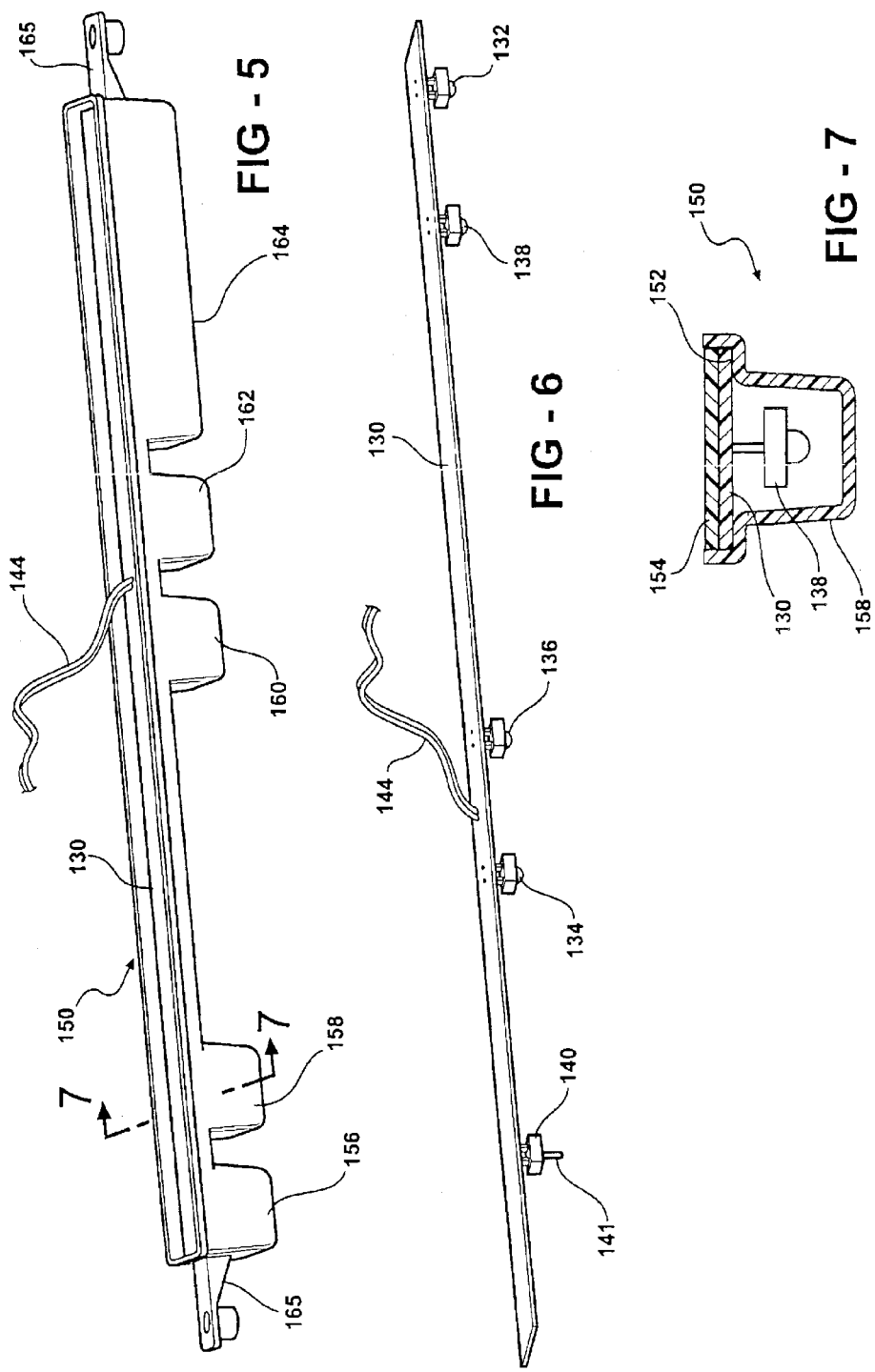

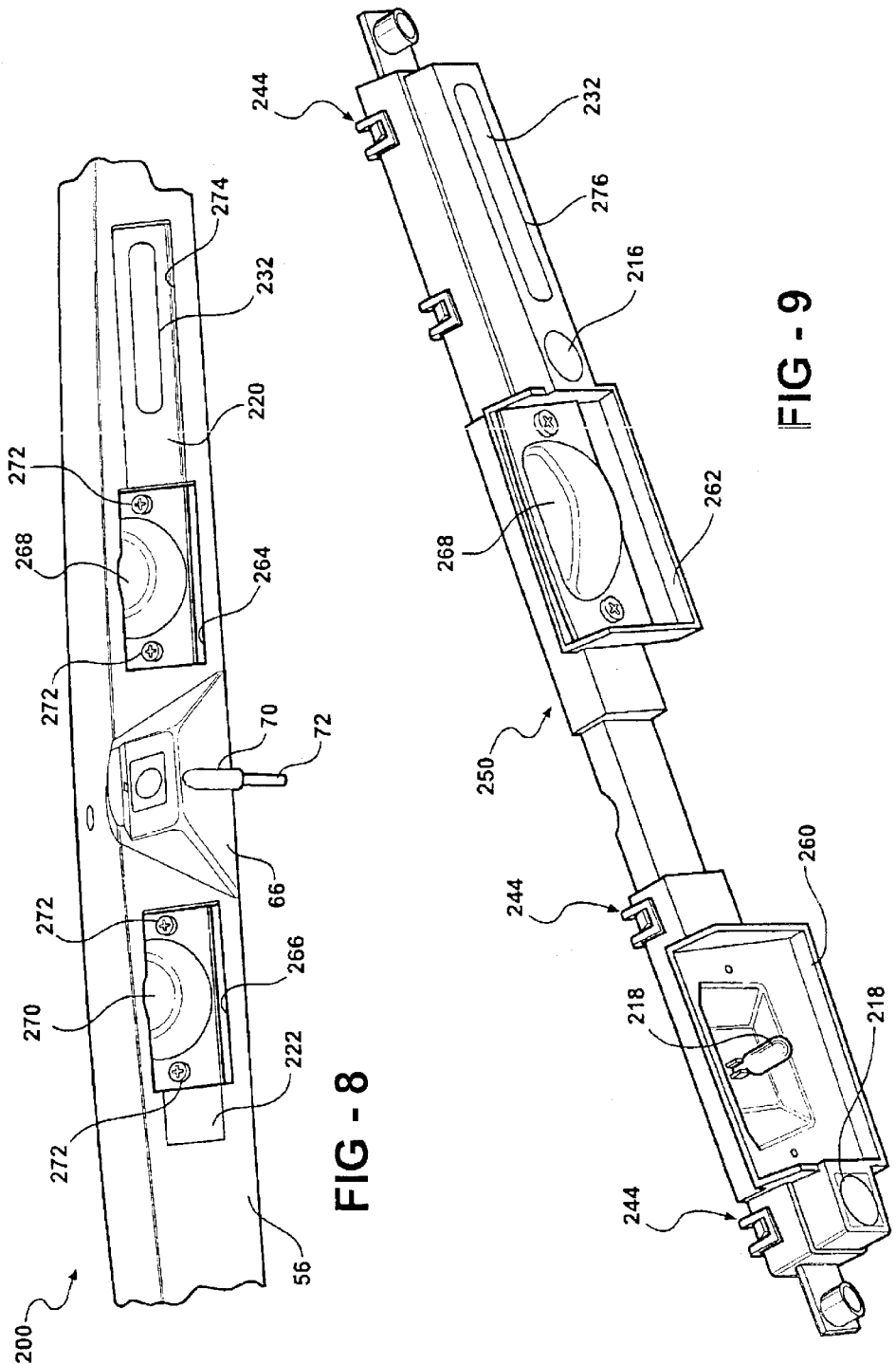

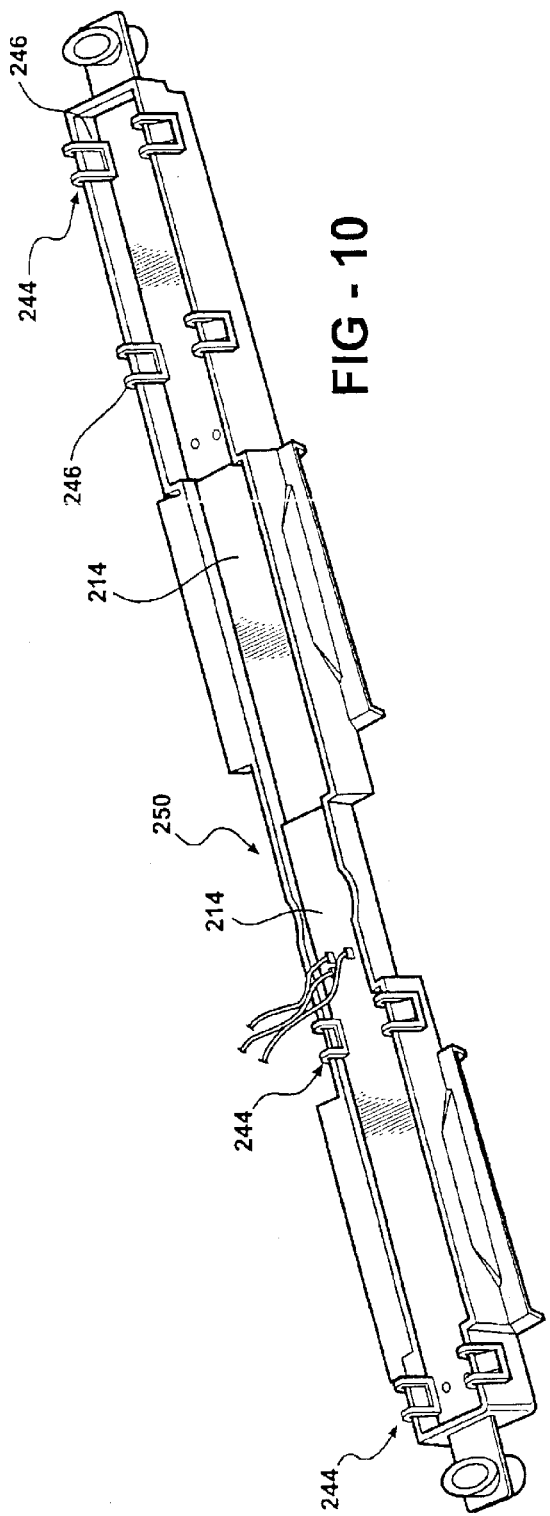
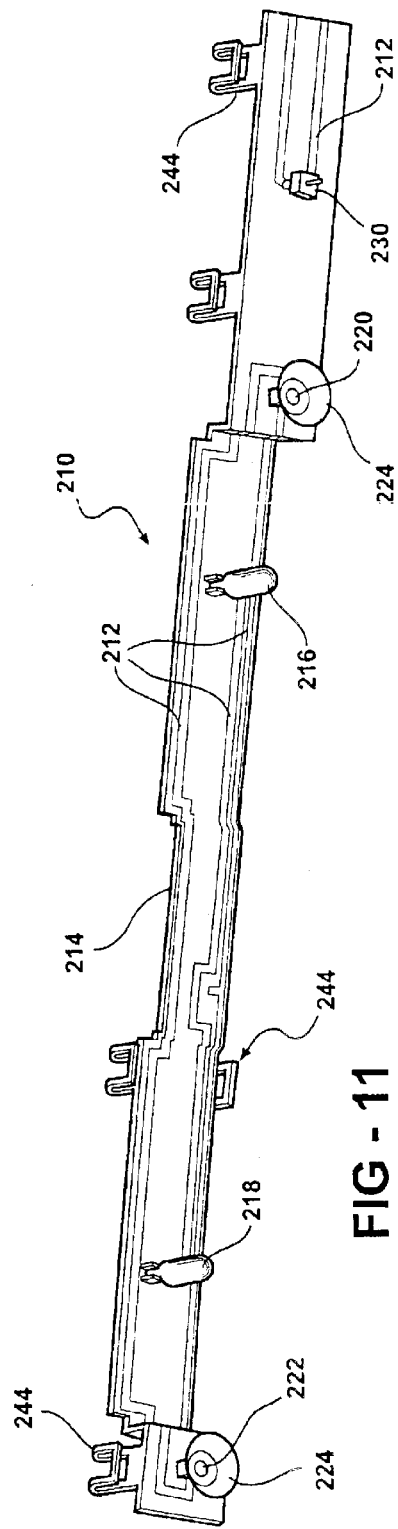

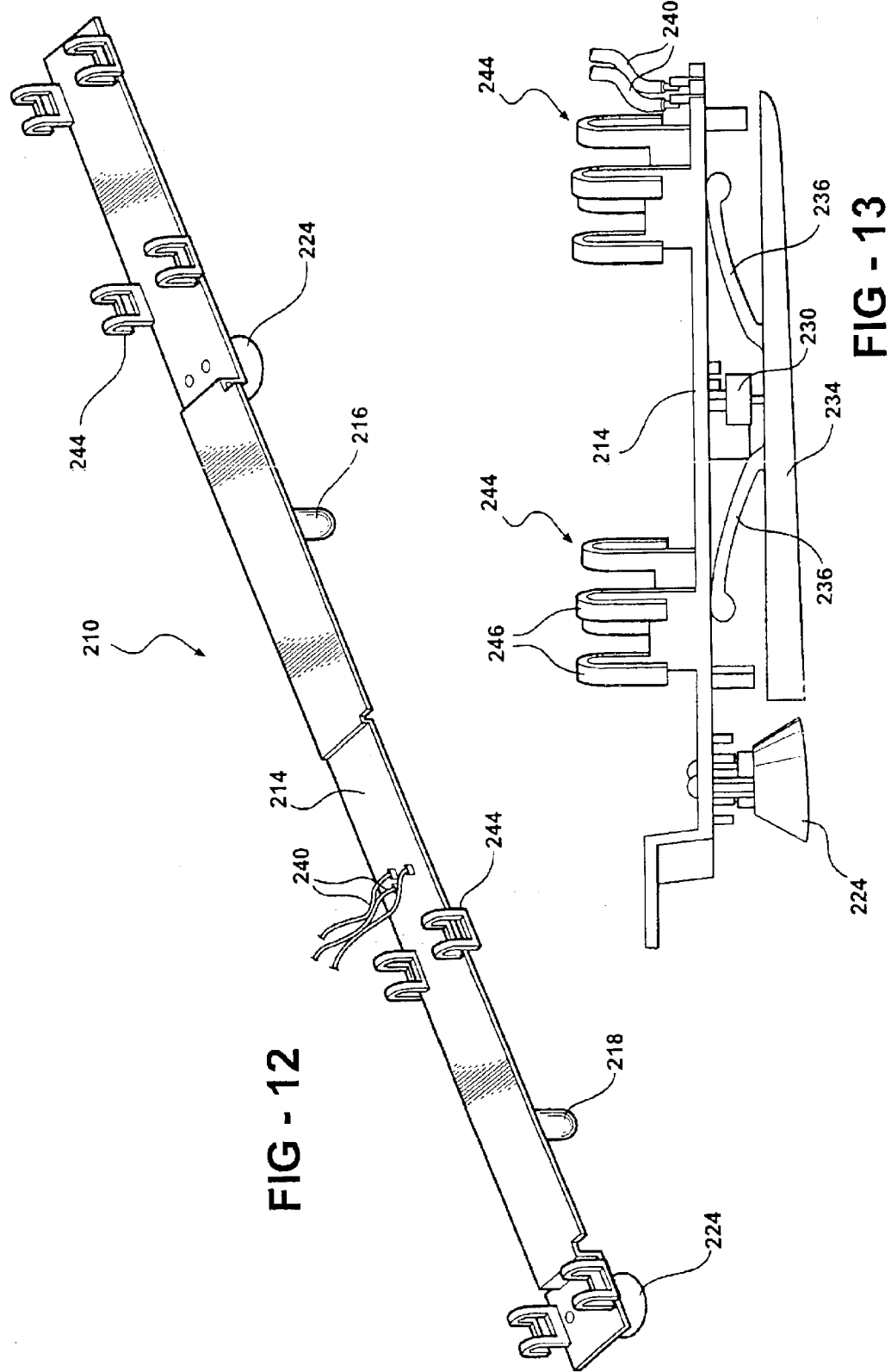

VEHICLE LIFTGATE WITH COMPONENT MODULE APPLIQUE

BACKGROUND

The present invention relates, in general, to motor vehicle liftgates or rear hatches and, more specifically, to accessory components mounted on such vehicle liftgate or rear hatches.

In modern vehicles, larger vehicles such as SUVs, vans and station wagons have a liftgate or rear hatch which closes a rear opening in the vehicle body. The liftgate is pivotally attached, usually by hinges, to the vehicle body structure surrounding the rear opening. The liftgate is releasably latchable to the vehicle structure by a latch mechanism so as to be movable between a closed position latched to the vehicle body structure and a pivoted, open position allowing access to the interior of the vehicle through the rear opening.

The liftgate itself is formed of a panel structure, which is stamped or otherwise formed into a panel having an upper opening for receiving a glass window. An interior trim panel is attachable to the liftgate panel to cover components mounted on the gate.

The liftgate forms a platform for a number of different accessories or components, such as a flipglass latch, a wiper motor and associated wiper arm, license plate lights, and a wash pump and/or wash nozzle. Various lights as well as the center high mounted stop light may also be mounted on the liftgate along with the liftgate latch mechanism. Other components which are usually mounted on the liftgate can include electrical contact connections to the defrost grid mounted on the liftgate glass or fiberglass.

All of these accessories or components are manufactured separately from the liftgate panel structure and are mounted, usually one at a time, on the liftgate while the vehicle is being assembled. The mounting of each component on the liftgate panel either directly or through brackets typically requires mechanical fasteners and, usually, an electrical connection via a plug-in connector, screw terminal, etc. All of the mounting procedures, and the mechanical and electrical connections require time, multiple workers and an increased length on the vehicle assembly line. In addition, although each component can be tested at its manufacturing site, the numerous multiple mechanical and electrical connections all create additional sources of defects which may require additional checking after assembly on the liftgate.

As can be seen, all of these factors lead to a substantial assembly time for the liftgate thereby resulting in a higher than desirable cost. To address these problems, a modular approach has been proposed in which several components are separably manufactured, pretested, and assembled into a single module, with only the module having to be mounted in a single operation on a liftgate. The number of separate mechanical fasteners and electrical connections can also be reduced by this modular approach. However, the modular approach has been proposed only for a limited number of components. This has resulted in less than anticipated savings in assembly time and labor.

Thus, it would be desirable to provide an improved modular component apparatus for vehicle liftgates in which multiple components are mounted in a single module for a single installation on the liftgate thereby improving reliability and reducing assembly costs. It would also be desirable to provide a modular component apparatus for a vehicle liftgate which has pre-aligned connection points, combined mounting points, and reduced weight which provides an increased glass viewing area.

SUMMARY

The present invention is an accessory component module for a vehicle liftgate which unitarily carries a plurality of components which can be mounted on a vehicle liftgate in a single assembly operation when the module itself is mounted on the liftgate.

In one aspect, the present module is in the form of a body having a plurality of individual components mounted thereon prior to mounting of the body of the module on a vehicle liftgate. The components include at least two of light sources, a camera and an actuator or switch.

When a camera is one of the components mounted on the body of the module, a camera lens is exposable through the body of the module, preferably through an aperture. A transparent cover may be mounted over the lens. A coating or a film may be disposed over the lens. An optional fluid dispensing nozzle may be mounted on the body for connection to a fluid conduit to enable cleaning fluid to be dispensed over the lens.

In one aspect of the invention, a printed circuit board carrying conductive traces or a lead frame having formed conductive leads mounted on a substrate are mounted in a carrier which is separately mountable to the body of the module. A sealing or potting component may be disposed over the printed circuit board and the lead frame. The light sources and switch or actuator may be mounted on the printed circuit board or the lead frame prior to insertion in the carrier.

In another aspect, the carrier is formed of a transparent material to enable light emitted by the light sources to be transmitted through the carrier and externally of the body of the module through apertures in the module. Alternately, removable lenses or covers may be attached to the carrier over apertures in the carrier to enable replacement of the light sources without removing the module from the liftgate.

In another aspect, an electrical harness is directly mounted on the printed circuit board or on the lead frame to provide connections to external vehicle conductors or harnesses.

The component module of the present invention provides significant advantages over previous liftgate accessory or component mounting methods by incorporating a plurality of liftgate components into a unitary module which can be attached to the liftgate in a single assembly operation. This improves the reliability of the components since the components can be preassembled, pretested and even pre-wired either before or after mounting on the module. The number of workers required to mount all of the components on the liftgate in the vehicle assembly line is reduced along with line length and assembly time. This reduces the overall costs of the liftgate components for more economical and efficient manufacturing operation. In addition, the number of electrical connectors and mechanical connection points are reduced for the liftgate to again reduce assembly time, cost and to improve reliability.

BRIEF DESCRIPTION OF THE DRAWING

The various features, advantages and other uses of the present invention will become more apparent by referring to the following detailed description and drawing in which:

FIG. 5 is a perspective view of the component carrier;

FIG. 6 is a perspective view of the printed circuit board mounted in the carrier of FIG. 5 for one aspect of the present applique module;

FIG. 7 is a cross-sectional view, generally taken along line 7—7 in FIG. 5;

FIG. 8 is a bottom perspective view of another aspect of an applique module according to the present invention;

FIG. 9 is a perspective view of the component carrier used in the applique module shown in FIG. 8;

FIG. 10 is a bottom perspective view of the carrier shown in FIG. 9;

FIG. 11 is a perspective view of the lead frame and component assembly used in the carrier of FIGS. 9 and 10;

FIG. 12 is a bottom perspective view of the lead frame and component assembly shown in FIG. 11; and FIG. 13 is a partial, enlarged perspective view of the electronic actuator handle used in the carrier shown in FIGS. 9–11.

DETAILED DESCRIPTION

Figures 1, 2:
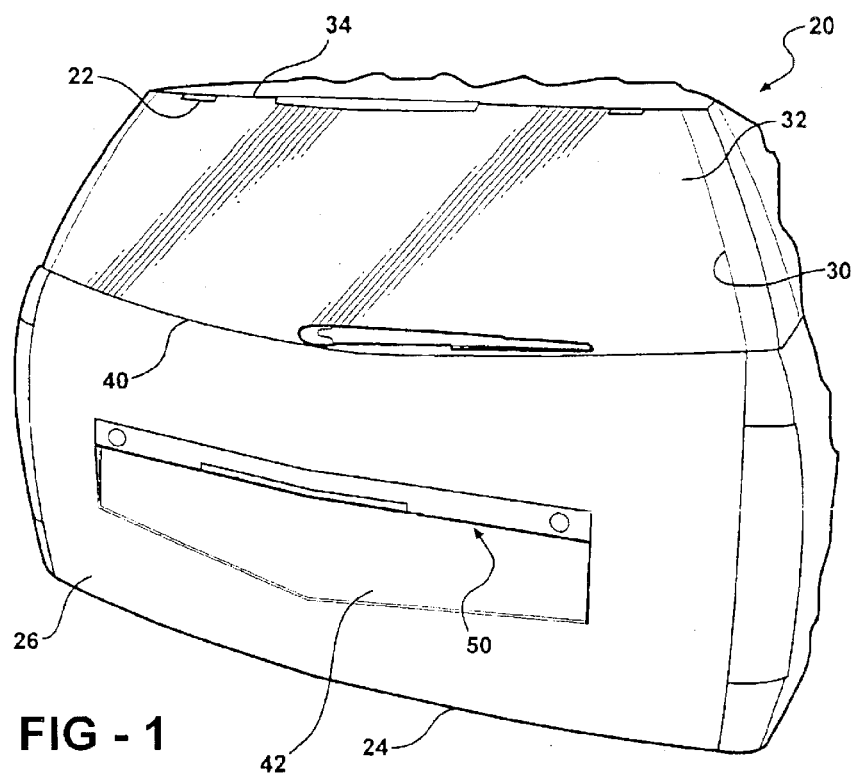
FIG. 1 is a perspective view of an exemplary vehicle liftgate utilizing the applique module according to the present invention.
FIG. 2 is a bottom perspective view of the applique shown in FIG. 1.

Referring now to the drawing, and to FIG. 1 in general, there is depicted a pictorial representation of a motor vehicle liftgate or rear hatch 20. The shape of the liftgate 20 will vary from vehicle to vehicle.

The liftgate 20 is intended, by example only, to be articulated or pivoted about an upper generally horizontally extending edge 22 by means of hinges attached to the surrounding vehicle body structure, not shown. When the liftgate 20 is pivotally mounted about the upper edge 22, the latch means will normally be associated with an opposed bottom edge 24. The liftgate 20 may also be articulated to the vehicle body about a vertical axis on one of the lateral side edges, with the opposite lateral edge carrying a locking means for securing the liftgate 20 in a fixed position closing the rear opening in the vehicle.

The liftgate 20 may be formed using any conventional manufacturing process, such as an outer panel 26 which is joined to an inner panel, not shown.

An aperture or opening 30 is formed in the liftgate 20. The aperture 30 is closed by a transparent panel 32, such as a glass window. The window 32 may be fixedly attached to the rear liftgate panel 26 or, articulated itself about an upper generally horizontally extending edge 34 to the upper edge portion of the liftgate 20 by means of one or more hinges 36 for pivotal movement of the opposed bottom end 40 between a closed position, sealed to the liftgate 20 and an open, pivotal position spaced from the adjacent portions of the outer liftgate panel 26. Such an articulated glass or window is commonly referred to as a flipglass.

As shown in FIG. 1, a recess 42 can be formed in the liftgate outer panel 26 to provide a convenient mounting location for a vehicle license plate, not shown. According to the present invention, an applique 50 is mounted on the exterior surface of the liftgate outer panel 26 immediately above the recess 42 and below the bottom horizontally extending edge 40 of the liftgate window 32. The applique 50 serves as a decorative outer surface consistent with the vehicle on which the liftgate 20 is mounted. The applique 50, which is typically formed of a plastic material, can be color molded or painted to match the body and liftgate color of the vehicle. The applique or module 50 is formed of suitable plastic material, such as PC, ABS, PBT or compounds thereof.

According to the present invention, the applique 50 serves as a component mount for various liftgate mounted accessories or components which enables such components to be pre-mounted, pre-wired and, if necessary, pre-tested before the applique 50 is mounted on the liftgate 20 in a single assembly operation.

Figure 3:
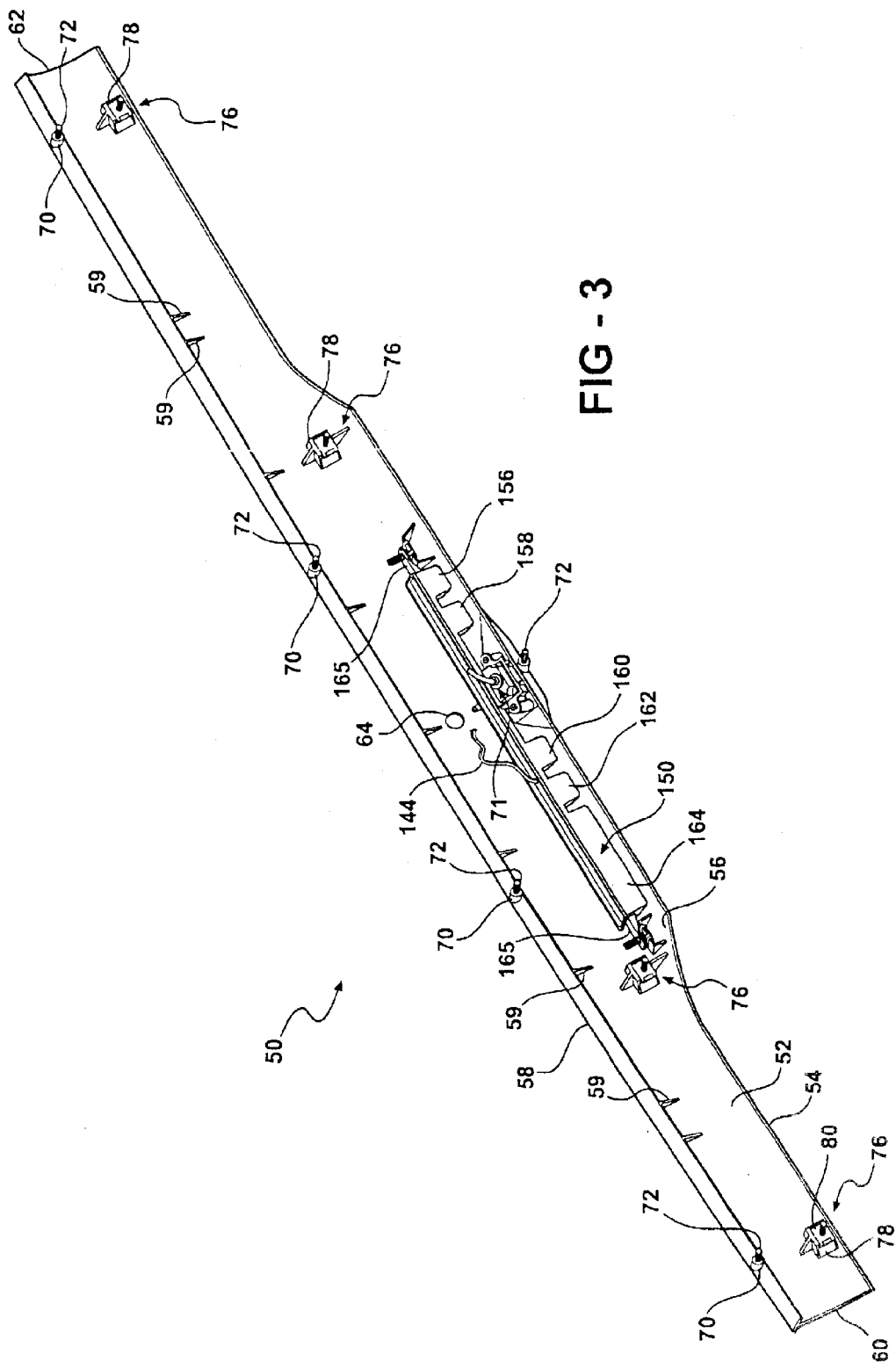
FIG. 3 is rear perspective view of the applique shown in FIGS. 1 and 2.
Figure 4:
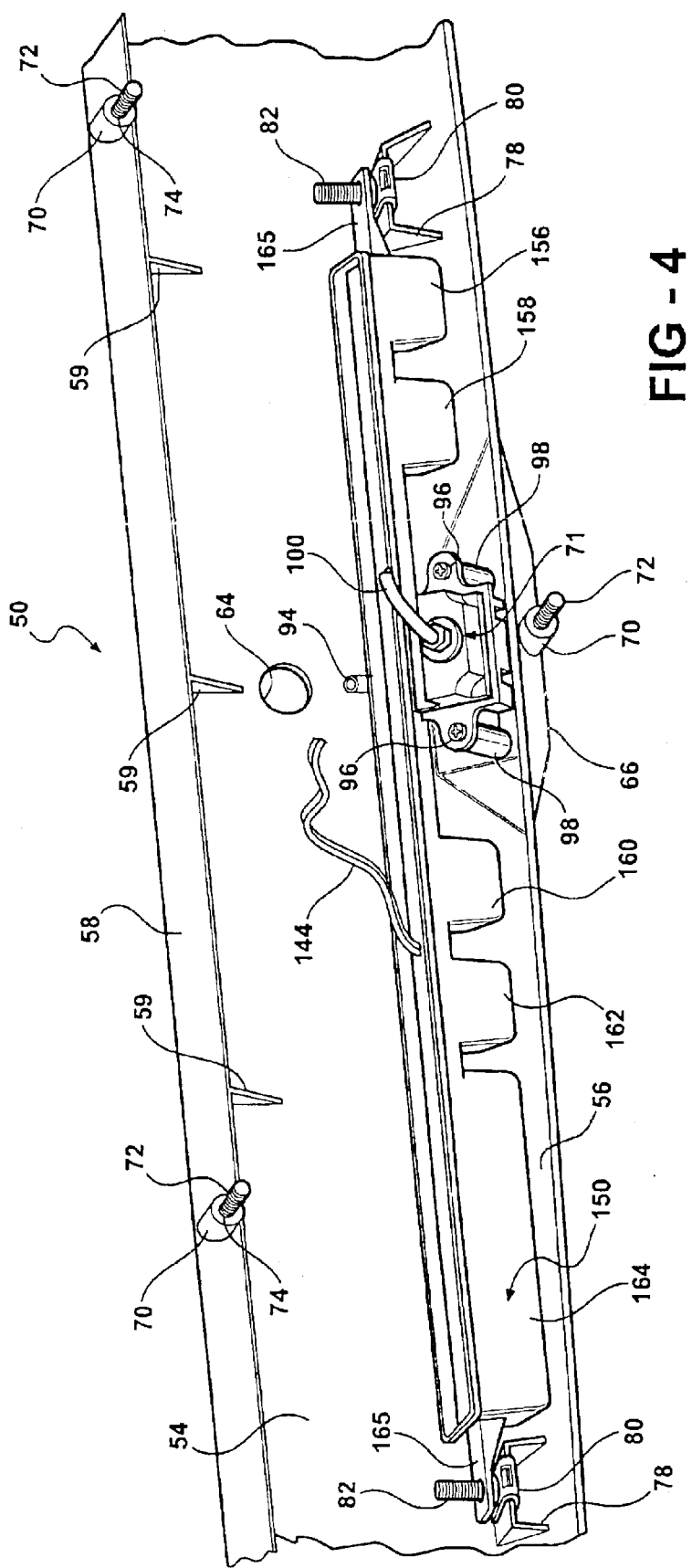
FIG. 4 is an enlarged perspective view generally similar to FIG. 3.

The applique 50 is shown more clearly in FIGS. 2–4, will have a shape consistent with the mounting location of the applique 50 on the liftgate 20. The applique 50 is typically in the form of a one piece body formed of molded plastic.

By example only, the applique 50 has a smoothly curved center portion 52 which transitions, at one edge 54 into an angularly disposed flange 56. The opposite edge of the center portion 52 likewise transitions into an arcuate flange 58 which extends substantially over the entire length of the applique 50 between opposed first and second ends 60 and 62.

An aperture 64 is formed intermediately between the first and second ends 60 and 62 in the center portion 52 for receiving the wiper motor drive shaft therethrough. The exterior end of the wiper motor drive shaft will be used for attachment of a wiper arm head.

As shown in FIGS. 2 and 4, a centrally located boss 66 is formed in the flange 56 and extends outward from an exterior surface 68 of the flange 56. The boss 66 is configured for serving as a mount for a camera or vision unit 71, as described hereafter.

Strengthening ribs 59 are formed laterally between the first and seconds ends 60 and 62 of the applique 50 and extend between the center portion 52 and the flange 58 for providing rigidity to the angularly disposed flange 58.

As seen in FIGS. 3 and 4, a plurality of spaced bosses 70 are integrally formed on the flange 58 and extend away from the flange 58 toward the liftgate 20 when the applique 50 is mounted on the liftgate 20. The bosses 70 are threaded and receive one end of a threaded nut having a threaded shank portion and an enlarged, generally centrally located washer 74 which seats against the outer edge of the boss 70 when the stud 72 is threaded into the boss 70. The exposed end of the stud 72 is insertable through an aperture, not shown, formed in the liftgate 20 and receives a tightenable nut to assist in fixedly mounting the applique 50 to the liftgate 20.

Additional mounts 76 are also provided on the applique 50 generally adjacent the edge 54 of the center portion 52. The mounts 76 are laterally spaced between the first and second ends 60 and 62 and fit within raised, open-ended generally inverted U-shaped bosses 78 which can be integrally molded with or otherwise fixed by welding or adhesive, to the center portion 52 of the module 50. A J-clip 80 is snap mountable over an edge of each boss 78 and traps the head of a threaded fastener 82 to the boss 78. The exposed ends of the fastener 82 will likewise extend through apertures in the liftgate for receiving a tightenable nut to assist in fixedly mounting the module 50 against the liftgate 20.

The applique module 50 is designed for receiving a plurality of different components to enable such components to be mounted on the liftgate 20 in a single assembly operation, rather than individually as has been the case in prior liftgate constructions.

One component mountable on the applique 50 is the camera or vision unit 71 which may be any suitable camera, such as a CCD camera or CMOS, which is capable of taking pictures in black and white or color of a field of vision provided by a camera lens 84. An aperture 86 is formed on a bottom surface 88 of the boss 66 on the applique 50 for providing an opening through which the lens 84 is visible.

As shown in FIG. 2, a nozzle 92 is mounted on the boss 66 in close proximity to the lens 84. The nozzle 92 receives fluid via a conduit 94 shown in FIG. 4 from a suitable fluid supply. This enables the lens 84 to be cleared of frost, ice, snow, dirt or other debris when necessary.

The camera or vision unit 71 is fixedly securable to the inner surface of the boss 66 by means of threaded fasteners 96 which are mountable in threaded stand-offs 98 integrally formed with the boss 66 or secured as separate members to the boss 66.

In place of or in addition to the nozzle 92, cleaning of the lens 84 may be implemented in other ways. For example, a hydrophobic or hydrophilic coating can be applied to the exterior surface of the lens 84 to repel debris. A thin defrost grid could also be mounted in or over the lens 84 to provide heating to remove frost, ice or snow from the lens 84 without interfering with operation of the camera 71.

Camera power and video output cables 100 extend from the camera 71, as shown in FIG. 4, for routing to a suitable camera output display device which is typically mounted in the interior in the passenger compartment of the vehicle.

Another threaded boss 70 is formed on a lower edge of the boss 66 and receives a threaded stud 72 to assist in securing the lower edge 54 of the applique 50 to the liftgate 20.

In the aspect of the applique 50 shown in FIGS. 1–7, the flange 56 on the applique 50 is formed with a plurality of spaced apertures 110, 112, 114, 116 and 118. The apertures 110 and 116 cooperate with light sources, described hereafter, to provide illumination for a vehicle license plate mounted in the recess 42 on the liftgate 20. The apertures 112 and 114 cooperate with light sources used to provide additional illumination for the camera 71.

The aperture 118 cooperates with an electronic actuator or switch mountable within the applique 50, as described hereafter, to provide an electrical actuation signal for use in operating a component mounted on the liftgate, such as a flip glass latch used to releasably latch the window 32 in a closed, sealed position on the liftgate 20, but allowing the bottom edge 40 of the glass 32 to be released from the latch and pivoted away from the liftgate 20 to an open position about the top mounted hinges 36.

It will be understood that although the apertures 110, 112, 114 and 116 are shown as being completely open, transparent covers, such as lens covers, may be mounted in the apertures 110, 112, 114 and 116 to seal the interior of the applique 50 while still allowing light from the associated light sources to pass therethrough.

According to a unique feature of the present invention, individual light sources and the switch actuated by the electronic handle are mounted on a support, such as a printed circuit board 130 in the aspect of the applique 50 shown in FIGS. 1–7, the printed circuit board 130 is formed with an elongated, strip-like shape according to conventional circuit board techniques. Individual electrical conductive traces are formed in the circuit board 130 to provide connection between light sources 132, 134, 136 and 138 as well as a switch means, such as a microswitch 140. Although the light sources 132, 134, 136 and 138 may comprise any suitable light source, such as an incandescent bulb, one or a cluster of LEDs are employed as the light sources 132, 134, 136 and 138, with one LED being shown as a pictorial example of each light source. Each LED 132, 134, 136 and 138 is secured to the printed circuit board 130 by solder or a press-in, snap connection to suitable leads to provide the desired current when the light sources are to be activated. Similarly, the switch 140 is mounted to suitable traces in the printed circuit board 130 to provide an output signal when the associated spring biased cover member 142 described hereafter, is depressed or touched.

Output signals from an electrical power to the traces in the printed circuit board 130 is provided by one or more conductors shown pictorially by reference number 144.

According to a unique of the applique 50, the printed circuit board 130 is sealingly mounted in a carrier denoted by reference number 150. The carrier 150 is formed with an upper trough section defined by an intermediate shoulder 152 which acts as a mounting seat for the printed circuit board 130. The upper portion of the trough-like section above the printed circuit board 130 can be filled with a suitable sealing or potting material 154 to seal the interior of the carrier 150 and the electrical components mounted on the printed circuit board 130.

Mounting flanges 165 project outwardly from opposite ends of the carrier 150 and have apertures formed therein for receiving a fastener 82 therethrough to enable the carrier 150 to be fixedly secured to the applique 50.

Individual pockets or receptacles 156, 158, 160, 162 and 164 are formed below the shoulder 150 along the length of the carrier 150. The chambers are laterally spaced and provide a chamber for one of the light sources 132, 134, 136 and 138 or the microswitch 140 associated with the electronic handle actuator 142.

The carrier is preferably formed of a suitable lightweight, plastic material. At least the lower portion of each chamber 156, 158, 160, 162 and 164 is transparent to allow light from the light sources 132, 134, 136 and 138 to pass through the carrier and the associated aperture in the flange 56 externally of the applique 50. The lower portion of each chamber 156, 158, 160 and 162 can be integral with the carrier 150, or can be mounted on the carrier 150 as a separate element as shown in FIG. 8.

In the case of the electronic actuator 142, the actuator 142 is typically in the form of a resilient membrane mounted internally to the bottom edge of the chamber 164 in a sealed manner. The center portion of the actuator membrane is movable against a plunger 141 of the switch 140 through an actuator spring 234 shown in FIG. 13 to provide an output signal from the switch 140 via switchable contacts in the switch housing.

In using the applique 50, the individual light sources 132, 134, 136 and 138 are pre-mounted on the printed circuit board 130 along with the switch 140, the actuating spring 234 and the member 142 are then mounted in the carrier 150 of the applique 50. The entire carrier 150 is then secured to the flange 56 of the applique 50 using the same inverted U-shaped bosses 78, J-clips and fasteners 82 described above. The camera 71 can also be mounted to the boss 66 by the fasteners 96.

The applique 50 is then mountable to the liftgate 20 in a single assembly operation, possibly by a single worker. The threaded studs 72 and the fasteners 80 are inserted through the appropriate apertures in the liftgate outer panel 26 and receive a tightenable nut which is rotated to a tightened state to fixedly, yet releasably secure the applique 50 to the liftgate 20. The individual electrical connections to the conductors 144 from the printed circuit board 130 can then be attached by screw terminals, soldering, etc., plug together connectors, etc. Likewise, the output signal from the camera 71 as well as the power supply to the camera 71 can also be provided by screw connections, snap together connectors, soldering, etc.

Referring now to FIGS. 8–13, there is depicted another aspect of an applique module 200 according to the present invention. The applique module 200 is constructed similar to the applique 50 in terms of shape, as well as the components mounted thereon. Thus, the applique 200 includes a boss 66 for receiving a camera.

In this aspect, the printed circuit board 130 is replaced with a lead frame assembly 210 in the carrier 150. In the lead frame assembly, stamped or otherwise formed electrically conductive leads are all denoted by reference number 212 are mounted on a substrate 214 in a configuration to provide power to an output signals from various components electrically connected to the individual leads 212. Thus, incandescent bulbs 216 and 218, or LEDs, are secured, such as by solder, to selected leads 212. Individual LEDs 220 and 222 are likewise soldered to the leads 212. Mirrored reflectors 224 are optionally mountable about each LED to enhance the illumination provided by each LED 220 and 222. The reflectors can be fixedly mounted to the substrate 214. A switch 230, similar to the microswitch 140 is also mounted by soldered, welded, or plugs to output terminals to the leads 212 to provide an actuation signal upon movement or depression of the electronic handle or membrane denoted by reference number 232 in FIGS. 8 and 9.

As more clearly shown in FIG. 13, a somewhat rigid actuator spring 234 is disposed between the membrane 232 and the substrate 214. Biasing arms 236 extend between a base portion of the spring 234 and the substrate 214 to bias the plate 234 normally away from the substrate 214. However, depression of the membrane 232 will cause the plate 234 to overcome the biasing force provided by the spring arms 236 and enable the plate 234 to depress the plunger on the switch 230 to generate an output signal from the switchable contact carried in the switch 230.

This aspect of suitable electrical connections via individual conductors 240 or a cable or harness may be employed to connect the individual leads 212 to an outside source of power, as well as to direct actuating signals from the switch 230 to the receiving unit.

As shown in FIGS. 8–13, the substrate 214 is formed with a plurality of hangers, each denoted by reference number 244 which can be integrally formed with the substrate 214 or attached thereto by suitable adhesive, sonic welding, heat welding, etc. Each hanger 244 has inverted U-shaped hanger elements 246 extending from at least one side edge of the substrate 214 at spaced locations along the length of the substrate 214.

The hangers 244 are designed and positioned for snap engagement with opposed side edges of a carrier 250. In this manner, the substrate 214 which may be formed of one or more individual substrate members, is fixedly held in position within the carrier 250. Although not shown, a suitable sealing or potting material may be placed within the upper portion of the carrier 250 to seal off the substrate 214 and the electrical connections and components mounted on the opposite side within the interior of the carrier 250.

As shown in FIGS. 9 and 10, the carrier 250 forms an elongated receptacle having a plurality of sections for receiving any number, type and combination of components, such as the membrane 232, to allow light to escape through an opening or lens cover from the LEDs 220 and 222, or to allow light to be transmitted from the incandescent bulbs 216 or 218.

The carrier 250 is provided with at least three-sided walls 260 and 262 which extend from an outer surface of the carrier so as to engage the sidewalls of apertures 264 and 266 in the flange 56 of the applique 200. Light or lens covers 268 and 270 are removably attached to the carrier 250 by means of threaded fasteners or screws 272. The interface between the lens covers 268 and 270 and the carrier 250 is sealed by a gasket or other sealing mechanism, not shown. This enables the lens cover 268 and 270 to be removed from the carrier 250 externally of the applique 200 for replacement of the bulbs 216 or 218. An aperture 274 is also formed in the flange 250 for exposing the end of a receptacle 276 in the carrier 250 which carries the actuator membrane 232.

The carrier 250 and the lens covers 268 and 270 are also usable with the LEDs 132, 134, 136 and 138.

The applique 200 provides the same one assembly operation mounting of a plurality of individual components to the liftgate 20 as does the applique 50. Both appliques reduce overall weight, simplify the assembly process by significantly reducing the assembly time, the number of workers required to mount the components on the liftgate, as well as increasing reliability of the applique and the components mounted thereon since such components have been mounted separately from the vehicle assembly operation and pretested if necessary thereby increasing the reliability of such components. The applique 200 can be equipped with many different components in addition to those described herein, such as a vehicle sealing gaskets, sealing foam, wiper arm park ramp, sensors, emitters, etc.

What is claimed is:

1. A component module mountable on an exterior surface of a vehicle liftgate, the module comprising:

a body;

a plurality of individual components mountable on the body prior to mounting of the module on the exterior surface of the vehicle liftgate;

a printed circuit board carrying conductive traces;

a carrier receiving the printed circuit board, with at least two of the components mounted on the printed circuit board; and means for fixedly mounting the carrier to the body.

2. The module of claim 1 further comprising:

the components including at least two of light sources, a camera with a lens, and at least one switch.

3. The module of claim 2 further comprising:

a camera lens exposable through the body of the module.

4. The module of claim 3 further comprising:

means for modifying adhesion between the lens and foreign matter.

5. The module of claim 1 further comprising:

the carrier formed of at least a transparent portion for transmitting light from light sources mounted on the printed circuit board interiorly of the carrier through the carrier.

6. The module of claim 1 wherein the body further comprises:

apertures formed in the body alignable with a light source mounted in the carrier.

7. The module of claim 6 wherein the light source comprises a light emitting diode.

8. The module of claim 1 wherein a light source comprises:

a light emitting diode.

9. A component module mountable on an exterior surface of a vehicle liftgate, the module comprising:

a body;
a plurality of individual components mountable on the body prior to mounting of the module on the exterior surface of the vehicle liftgate;
a substrate;
a lead frame with a plurality of conductive leads fixedly mounted on the a substrate;
the components electrically connected to the leads;
a carrier receiving the lead frame and the components on the lead frame; and
at least one of components being a light source, the light source including an incandescent bulb.

10. The module of claim 9 further comprising:
the carrier formed of at least a transparent portion for transmitting light from light sources mounted on the lead frame interiorly of the carrier through the carrier.

11. The module of claim 9 wherein the body further comprises:
apertures formed in the body alignable with a light source mounted in the carrier.

12. The module of claim 1 further comprising:
an electrical harness extending from the printed circuit board adapted for connection to external circuits.

13. The module of claim 9 further comprising:
an electrical harness extending from the lead frame adapted for connection to external circuits.

14. A component module mountable on an exterior surface of a vehicle liftgate, the module comprising:
a body;
a plurality of individual components mountable on the body prior to mounting of the module on the exterior surface of the vehicle liftgate, wherein the components include at least two of light sources, at least one switch, a camera with a lens exposable through the body of the module; and
means for modifying adhesion between the lens and foreign matter, the adhesion modifying means including a transparent cover mounted in the body over the lens.

15. A component module mountable on an exterior surface of a vehicle liftgate, the module comprising:
a body;
a plurality of individual components mountable on the body prior to mounting of the module on the exterior surface of the vehicle liftgate, wherein the components include at least two of light sources, at least one switch, a camera with a lens exposable through the body of the module; and
means for modifying adhesion between the lens and foreign matter, the adhesion modifying means including a hydrophobic film disposed over the camera lens.

16. A component module mountable on an exterior surface of a vehicle liftgate, the module comprising:
a body;
a plurality of individual components mountable on the body prior to mounting of the module on the exterior surface of the vehicle liftgate, wherein the components include at least two of light sources, at least one switch, a camera with a lens exposable through the body of the module; and
means for modifying adhesion between the lens and foreign matter, the adhesion modifying means including a fluid dispensing nozzle mounted on the body for dispensing cleaning fluid over the lens, the nozzle connected by a fluid conduit to a fluid source.

17. A component module mountable on an exterior surface of a vehicle liftgate, the module comprising:
a body; and
a plurality of individual components mountable on the body prior to mounting of the module on the exterior surface of the vehicle liftgate, wherein the components include at least two of light sources, a camera with a lens, and a switch, the switch including a resilient membrane carried on the body and movable from an exterior of the body, movement of the membrane actuating the switch.

18. The module of claim 17 further comprising:
a return biasing element acting on the membrane.

19. A component module mountable on an exterior surface of a vehicle liftgate, the module comprising:
a body;
a plurality of individual components mountable on the body prior to mounting of the module on the exterior surface of the vehicle liftgate;
a printed circuit board carrying conductive traces;
a carrier receiving the printed circuit board, with at least two of the components mounted on the printed circuit board; and
sealing material sealing the printed circuit board in the carrier.

20. A component module mountable on an exterior surface of a vehicle liftgate, the module comprising:
a body;
a plurality of individual components mountable on the body prior to mounting of the module on the exterior surface of the vehicle liftgate;
a printed circuit board carrying conductive traces;
a carrier receiving the printed circuit board, at least two of the components mounted in the carrier; and
apertures formed in the body alignable with a light source mounted in the carrier the light source including one of a light emitting diode and an incandescent bulb.

21. The module of claim 20 further comprising:
at least one lens cover mounted on the carrier, the at least one lens cover is accessible exteriorly of the body.

22. The module of claim 21 wherein:
the at least one lens cover is removably mounted on the carrier.

23. A component module mountable on an exterior surface of a vehicle liftgate, the module comprising:
a body;
a plurality of individual components mountable on the body prior to mounting of the module on the exterior surface of the vehicle liftgate;
a substrate;
a lead frame with a plurality of conductive leads fixedly mounted on the substrate;
the components electrically connected to the leads;
a carrier receiving the lead frame and the components on the lead frame; and
a light source with lens covers removably mounted to the carrier, the lens covers being accessible exteriorly of the body.

24. A component module mountable on an exterior surface of a vehicle liftgate, the module comprising:
a body;
a plurality of individual components mountable on the body prior to mounting of the module on the exterior surface of the vehicle liftgate;

a substrate;

a lead frame with a plurality of conductive leads fixedly mounted on the substrate;

the components electrically connected to the leads;

a carrier receiving the lead frame and the components on the lead frame; and sealing material sealing the lead frame in the carrier.

25. A component module mountable on an exterior surface of a vehicle liftgate, the module comprising:

a body; and a plurality of individual components mountable on the body prior to mounting of the module on the exterior surface of the vehicle liftgate;

a substrate;

a lead frame with a plurality of conductive leads fixedly mounted on the substrate;

the components electrically connected to the leads;

a carrier receiving the lead frame and the components on the lead frame; and means for fixedly mounting the carrier to the body.

* * * * *